United States Patent
Hartman et al.

(10) Patent No.: US 11,616,435 B2
(45) Date of Patent: Mar. 28, 2023

(54) POWER SUPPLY CONTROLLER WITH A LOAD LINE COMPENSATOR

(71) Applicant: Rohm Powervation Limited, Blackrock (IE)

(72) Inventors: Mark Hartman, Santa Clara, CA (US); Jingquan Chen, San Jose, CA (US); Jeffrey D. Mincey, San Jose, CA (US)

(73) Assignee: ROHM CO., LTD., Blackrock (IE)

( * ) Notice: Subject to any disclaimer, the term of this patent is extended or adjusted under 35 U.S.C. 154(b) by 264 days.

(21) Appl. No.: 16/323,497

(22) PCT Filed: Aug. 6, 2017

(86) PCT No.: PCT/EP2017/069877
§ 371 (c)(1),
(2) Date: Feb. 5, 2019

(87) PCT Pub. No.: WO2018/024911
PCT Pub. Date: Feb. 8, 2018

(65) Prior Publication Data
US 2020/0358353 A1    Nov. 12, 2020

Related U.S. Application Data

(60) Provisional application No. 62/371,502, filed on Aug. 5, 2016.

(51) Int. Cl.
*H02M 3/156*    (2006.01)
*H02M 1/00*    (2006.01)

(52) U.S. Cl.
CPC ......... *H02M 3/156* (2013.01); *H02M 1/0025* (2021.05); *H02M 1/0016* (2021.05)

(58) Field of Classification Search
CPC . H02M 2001/0019; H02M 2001/0016; H02M 2003/1566; H02M 3/157;
(Continued)

(56) References Cited

U.S. PATENT DOCUMENTS 8,049,482 B2    11/2011    Tang et al.
9,240,721 B2    1/2016    Babazadeh et al.
(Continued)

OTHER PUBLICATIONS

The International Bureau of WIPO, "Search Report" in application No. PCT/EP2017/069877, dated Feb. 26, 2019, 14 pages.
(Continued)

*Primary Examiner* — Gustavo A Rosario-Benitez
(74) *Attorney, Agent, or Firm* — Hickman Becker Bingham Ledesma LLP

(57) ABSTRACT

The present application provides a controller for a switching power supply such as a DC-DC converter which provides an output voltage and an output current. The controller is configured to provide at least one control signal to operate the switching power supply to maintain the output voltage at a first reference voltage. The controller employs a load line compensator responsive to output current for adjusting the reference voltage employed by the compensator. The load line compensator employs one or either or both of a high pass filter or saturating element to provide a filtered/saturated value which is the value employed in adjusting the reference voltage.

18 Claims, 5 Drawing Sheets

(58) Field of Classification Search
CPC ........ H02M 3/158; H02M 3/156; H02M 1/14; H02M 1/143; H02M 2001/0025
See application file for complete search history.

(56) References Cited

U.S. PATENT DOCUMENTS

| | | | | |
|---|---|---|---|---|
| 9,882,462 | B2* | 1/2018 | Kelly | H02M 1/00 |
| 2001/0017536 | A1* | 8/2001 | Darzy | H02M 3/156 |
| | | | | 323/284 |
| 2002/0171985 | A1* | 11/2002 | Duffy | G06F 1/305 |
| | | | | 361/90 |
| 2004/0046535 | A1* | 3/2004 | Duffy | H02M 3/157 |
| | | | | 323/283 |
| 2005/0077883 | A1* | 4/2005 | Walters | H02M 3/156 |
| | | | | 323/273 |
| 2007/0200607 | A1* | 8/2007 | Ohshima | H02M 7/219 |
| | | | | 327/256 |
| 2008/0252277 | A1 | 10/2008 | Sase et al. | |
| 2008/0272756 | A1* | 11/2008 | Melanson | H02M 1/4225 |
| | | | | 323/282 |
| 2010/0079323 | A1* | 4/2010 | Miao | H02M 3/157 |
| | | | | 341/142 |
| 2010/0188062 | A1 | 7/2010 | Candage et al. | |
| 2012/0139513 | A1* | 6/2012 | Sreenivas | H02M 3/156 |
| | | | | 323/272 |
| 2012/0212293 | A1* | 8/2012 | Khlat | H03F 3/24 |
| | | | | 330/127 |
| 2014/0002044 | A1* | 1/2014 | Babazadeh | H02M 3/1588 |
| | | | | 323/282 |
| 2014/0002932 | A1* | 1/2014 | Tang | H02M 1/32 |
| | | | | 361/18 |
| 2014/0015500 | A1* | 1/2014 | Babazadeh | H02M 3/1584 |
| | | | | 323/272 |
| 2015/0115910 | A1* | 4/2015 | Jiang | H02M 3/1584 |
| | | | | 323/271 |
| 2015/0155786 | A1* | 6/2015 | Shen | H02M 3/33523 |
| | | | | 363/15 |
| 2016/0141966 | A1* | 5/2016 | Huang | H02M 3/33523 |
| | | | | 363/21.15 |
| 2017/0358984 | A1* | 12/2017 | Unno | H02M 3/158 |
| 2018/0233925 | A1* | 8/2018 | Boehmer | H02M 3/158 |
| 2020/0099288 | A1* | 3/2020 | Young | H02M 1/12 |

OTHER PUBLICATIONS

Current Claims in application No. PCT/EP2017/069877, dated Feb. 2019, 3 pages.
Zhang, Jianhui, "Advanced Pulse Width Modulation Controller les for Buck DC-DC Converters", dated Dec. 14, 2006, 124 pages.
The International Searching Authority, "Search Report" in application No. PCT/US2017/069877, dated Nov. 20, 2017, 19 pages.

* cited by examiner

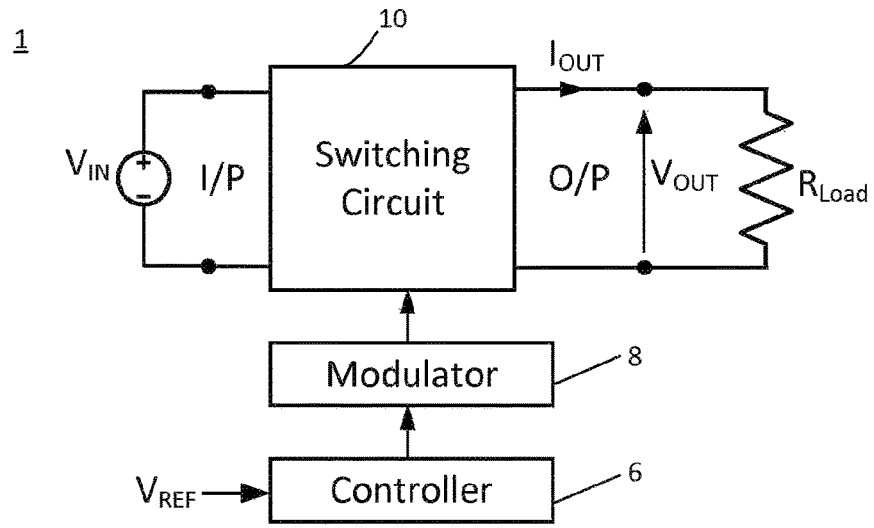
*Prior Art*        Fig. 1
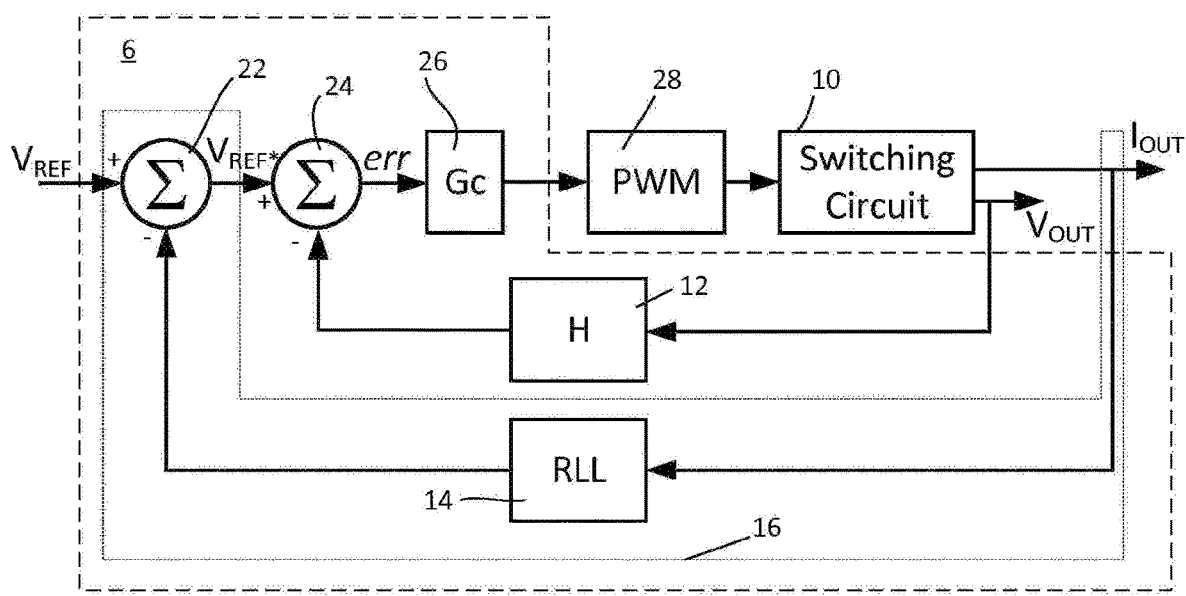
*Prior Art*        Fig. 2

POWER SUPPLY CONTROLLER WITH A LOAD LINE COMPENSATOR

CROSS-REFERENCE TO RELATED APPLICATION

This application is a U.S. National Stage Patent Application filed under 35 U.S.C. § 371 of International Patent Application Number PCT/EP2017/069877 filed Aug. 6, 2017, which claims priority under 35 U.S.C. § 119(e) to U.S. Provisional Patent Application No. 62/371,502 filed Aug. 5, 2016, the entire contents of all of which are hereby incorporated by reference as if fully set forth herein for all purposes.

FIELD OF THE APPLICATION

The present application relates to switching power supplies and in particular to a controller for a switching power supply.

BACKGROUND OF THE APPLICATION

The general purpose of a controller in a power supply is to try and ensure that the output voltage of the power supply follows a reference value.

A conventional arrangement employing such a controller is shown generally in FIG. 1.

In the arrangement shown, the power supply circuit has a switching circuit 10 which provides a regulated output voltage $V_{out}$ from an input voltage VIN. As would be familiar to those skilled in the art, the switching circuit employs one or more switching devices configured in combination with one or more storage elements (e.g. inductors and capacitors) to convert an input voltage to an output voltage. The switching elements and storage elements are arranged together in a switching topology. Examples of switching topologies include, for example, Buck, Boost and Flyback.

A controller 6 is employed to control the operation of the switching devices within the switching circuit 10. The controller uses feedback to try and ensure that the output voltage $V_{out}$ is maintained at a level corresponding to a reference voltage $V_{REF}$. Generally, the output voltage is compared with the reference voltage to provide an error signal err. This error signal is then acted upon by the controller to provide a control signal. The control signal is typically then presented to a modulator 8 which in turn provides switching signals to the one or more switches within the switching circuit 10. A known problem with such feedback control systems is that there is a tradeoff in stability in order to allow for improved transient response. This is due to the relatively fixed relationships between operating frequencies and control loop crossover frequencies.

A known method to improve the dynamic performance of a power supply without increasing the bandwidth of the controller is to introduce a feedforward arrangement. An exemplary load current feed-forward control arrangement, shown in FIG. 2, comprises a conventional feedback controller as described above where the output voltage $V_{out}$ is compared with a reference voltage $V_{REF}$ to provide an error signal err which is acted on by a compensator 26 having an appropriate control function (which may for example be a combination of Proportional, Integral and derivative elements) which in turn provides a control signal to a modulator 8 which in turn provides a switching signal to the switching circuit 10.

Additionally, however, the arrangement feeds back a measure of output current $I_{out}$, which is modified by a gain element 14 to provide a signal which is used in turn to modify the reference voltage $V_{Ref}$ to provide a modified reference voltage $V_{Ref}^*$ which in turn is compared with the output voltage to provide the error signal. As demonstrated in FIG. 3, the gain element is representative of a load line resistance value $R_{LL}$ such that Vref is adjusted downward by a voltage corresponding to $I_{OUT}^* R_{LL}$. As a result, the technique is known as resistive load line feedforward. The frequency response of the load line is typically flat although there may be an inherent tendency as with all gain devices to have a high frequency roll-off as shown in FIG. 4.

It will be appreciated by those skilled in the art, that load line feedforward effectively creates a virtual series impedance $R_{LL}$ at the output of a power supply, which as explained above is typically achieved by offsetting the voltage reference as a function of output current.

The present application provides an improved arrangement of load line feedforward control for a power supply. The technique is advantageous in a number of situations including current sharing arrangements.

SUMMARY

A first aspect of the present application provides a controller for a switching power supply providing an output voltage and an output current. The controller suitably comprises a compensator which is configured to provide at least one control signal to operate the switching power supply to maintain the output voltage at a first reference voltage, a load line compensator which is configured to be responsive to output current for adjusting the reference voltage employed by the compensator. Suitably, the load line compensator comprises a high pass filter for filtering the output current to provide a filtered value and the filtered value is employed in adjusting the reference voltage.

The cutoff frequency of the high pass filter may be adjustable. The load line compensator suitably comprises a gain element such that the combination of the high pass filter and gain element provide a gain filtered value which is employed in adjusting the reference voltage.

The controller may further comprise a saturator for limiting the response of the load line compensator. The saturator may limit the gain filtered value to an adjustable limit.

The load line compensator may be configured to subtract the gain filtered value from a second reference voltage to provide the first reference voltage.

The controller may further comprise a modulator for modulating the at least one control signal to produce at least one modulated control signal and wherein the at least one modulated control signal is applied to one or more switches within a switching circuit of the switching power supply. The modulator may be a pulse width modulator.

The compensator may be a combination of one or more of Proportional, Integral and Derivate control elements.

A switching circuit may be provided which is responsive to the controller. The switching circuit and controller may be provided together in a power supply, for example a DC-DC converter.

In a second aspect, a controller is provided for a switching power supply providing an output voltage and an output current. Suitably, the controller comprises a compensator configured to provide at least one control signal to operate the switching power supply to maintain the output voltage at a first reference voltage, a load line compensator responsive to output current for adjusting the reference voltage employed by the compensator, wherein the load line compensator comprises a saturating element for limiting the value of output current to a saturation limit which is employed in adjusting the reference voltage.

The saturation limit may be an adjustable limit. The controller may further comprise an offset element which prevents operation of the load line compensator below an offset value of output current. The offset value may be programmable.

The controller may further comprise a high pass filter for filtering the output current employed by the load line compensator. Suitably, the cutoff frequency of the high pass filter is adjustable. The load line compensator suitably comprises a gain element such that the combination of the high pass filter and gain element provide a gain filtered value which is employed in adjusting the reference voltage. The load line compensator may be configured to subtract the gain filtered value from a second reference voltage to provide the first reference voltage.

The controller may further comprising a modulator for modulating the at least one control signal to produce at least one modulated control signal and wherein the at least one modulated control signal is applied to one or more switches within a switching circuit of the switching power supply. This modulator may be a pulse width modulator.

The compensator may a combination of one or more of Proportional, Integral and Derivate control elements. The controller may be provided with a switching circuit which it controls in a power supply. The power supply may for example be a DC-DC converter.

These and other aspects of the application will become apparent from the detailed description which follows.

DESCRIPTION OF DRAWINGS

The present application will now be described with respect to the drawings, in which:

FIG. 1 is an example of a known control arrangement for a power supply;

FIG. 2 is a known example of a controller employing a resistive load line technique;

DETAILED DESCRIPTION

The present application provides an improved load-line feedforward control arrangement in which constraints are imposed upon the load-line feedforward part of the control arrangement to improve the performance of the control arrangement.

One place where resistive load line techniques are employed is with current sharing loops. Unfortunately, these loops must be outside the voltage control loops and necessitate that their response BW be significantly lower. Typically, a rule of thumb chosen is that the current sharing loop BW<$\frac{1}{10}$ voltage loop BW and as a result current sharing loop cannot balance high frequency disturbances such that the outer current sharing loop is too slow to provide adequate current sharing during any event that causes a step (or high frequency) change in the voltage loop error.

At the same time, when operating multiple voltage mode controllers in parallel, significant voltage error can persist when slewing the references due to small timing errors or device to device variation in the reference accuracy. This is a common problem when ramping up the output voltage from 0 V at turn-on.

Typically, load lines are used for either a transient benefit or to aid in current sharing stability. However, there is a disadvantage in some systems in that the output voltage has a worse load regulation specification.

The present application modifies existing resistive load line approaches by introducing a non-resistive load line. The non-linear load line may comprise a load line with one or both of an offset and a clamp (saturation). Additionally or alternatively, the non-linear load line may comprise one or both of low-pass and high pass filters.

The improved arrangement will now be described with reference to some exemplary aspects.

Figure 3:
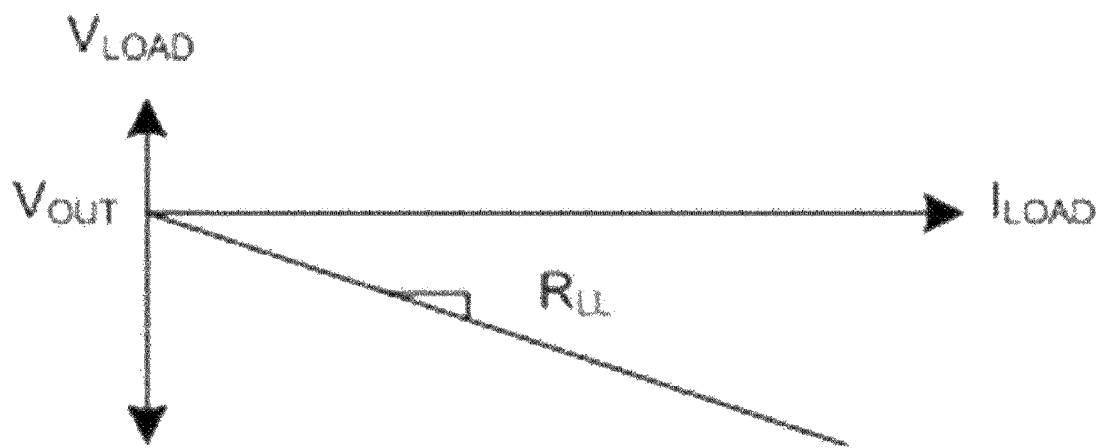
FIG. 3 illustrates the gain for an exemplary prior art resistive load line of the type shown in FIG. 2.
Figure 4:
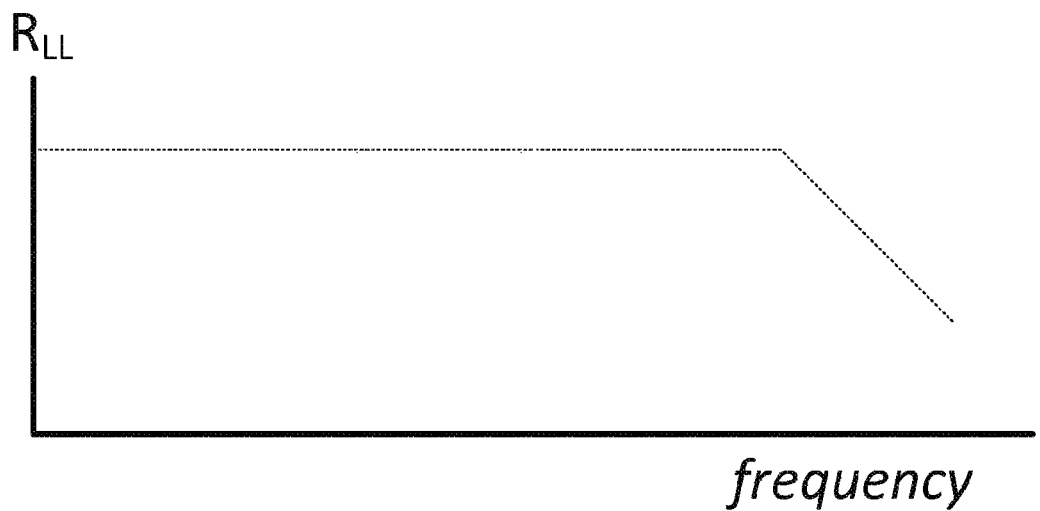
FIG. 4 illustrates an exemplary frequency response in the form of a bode plot for an exemplary prior art resistive load line of the type shown in FIG. 2.
Figure 5:
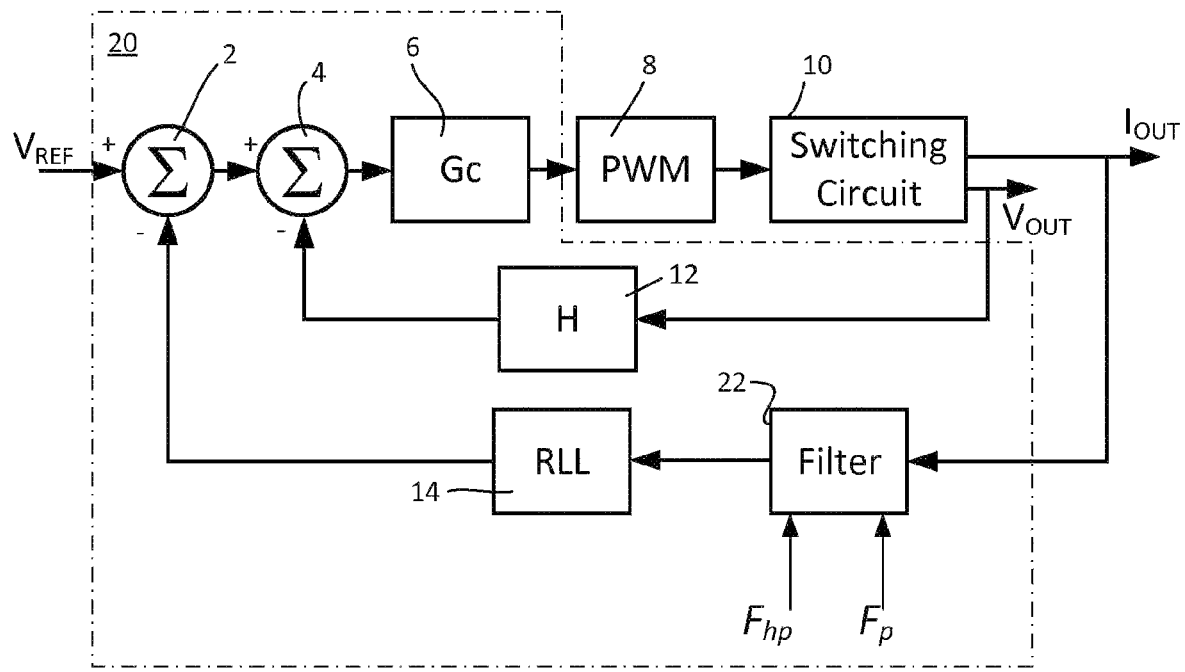
FIG. 5 is an improved controller according to a first aspect of the present application.

In a first aspect, shown in FIG. 5, the arrangement corresponds generally to that of the load-line feedforward controller of FIG. 2, in that a controller 20 is provided having an inner loop which is provided to regulate the output voltage by comparing it with a reference voltage and providing the resulting error signal to a compensator 26.

More particularly, the first aspect provides a controller 20 for controlling the operation of a switching circuit of a switching power supply.

The switching circuit provides an output voltage with an output current which is provided to a load. The controller aims to operate the switching circuit so as to maintain the output voltage at a desired level, i.e. a reference voltage ($V_{REF}$). To achieve this the controller comprises a conventional feedback compensator comprising a feedback gain element 12, a comparator 24 and a compensator function 26. As would be familiar to those skilled in the art, the output voltage is fed back through the feedback gain element 12 to the comparator 24 where it is subtracted from the reference voltage to provide an error signal. The error signal is in turn employed by the compensator 6 to provide a control signal to a modulator 8. The modulator, suitably a pulse width modulator, provides one or more switching signals to one or more switches within the switching circuit. The compensator 6 may be any suitable compensator such as for example a proportional compensator but may equally comprise integral or derivative elements. Other compensators may also be employed. The compensator aims to regulate the output voltage to be that of the reference voltage.

The controller further provides for load line compensation whereby the reference voltage employed by the compensator is adjusted based on a measurement of output current. The load line compensator comprises a gain element in series with a filter element and the two combine to provide a gain filtered value of output current which is used to adjust the reference voltage employed by the compensator. In the exemplary aspect shown, this is achieved by subtracting the gain filtered value of output current from a reference voltage in comparator 22 to provide a modified reference voltage which is employed by the compensator. It will be appreciated that the order of the elements need not be as shown. For example, the gain element may precede or follow the filtering element or the two may be combined together. Equally, it will be appreciated that by appropriate arrangement, that the filtering may be performed after the comparator 22.

Figure 7:
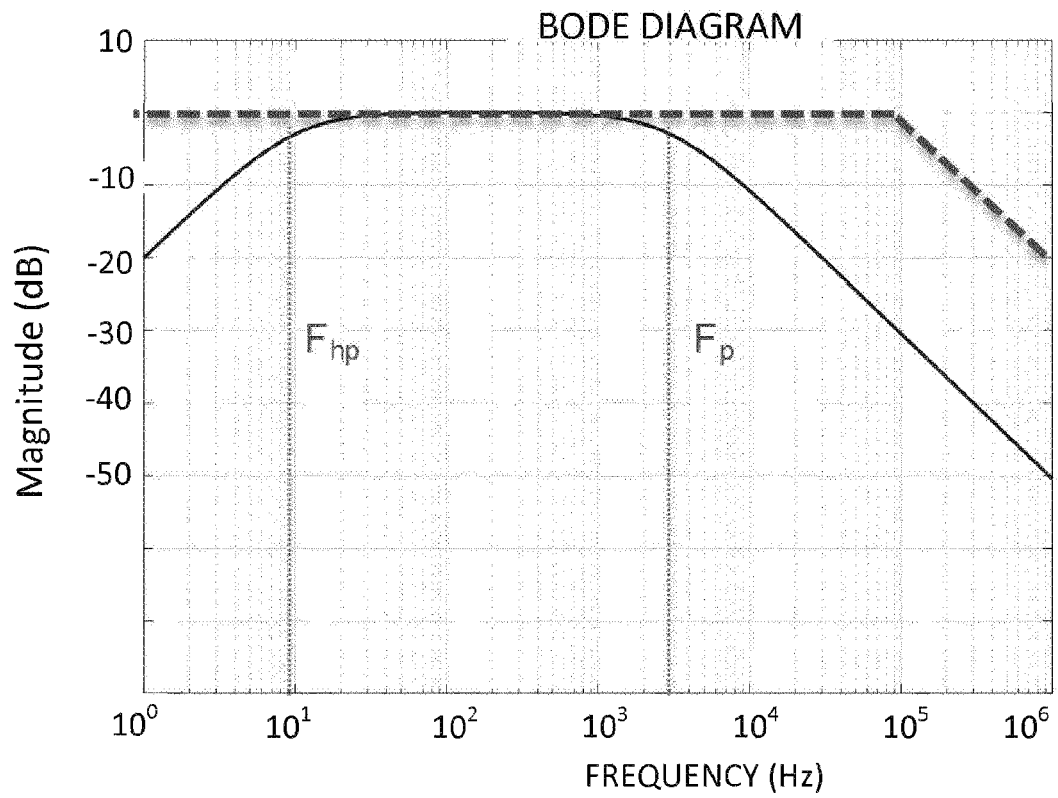
FIG. 7 illustrates the frequency response for the first aspect shown in FIG. 5.

The filter may be one of a low pass filter or a high pass filter or a combination of the two. In the context of the the low pass filter, the (3 dB) frequency would be less than that of the normal gain rolloff of the $R_{LL}$ gain. The frequency of the high pass filter would be less than that of the high pass filter so that when both are employed together a band-pass filter is formed as shown in FIG. 7. An advantage of including the high pass filter in the arrangement is that DC load regulation performance is not sacrificed. This makes the approach an attractive option for applications that use the load line function for AC stability (for example when paralleling voltage loop controllers to feed one high current output).

Advantageously, the filters may be implemented digitally within a controller. An advantage of which is that it easier to provide for adjustable filter characteristics. More particularly, the cut-off frequency of one or both of the high pass and low pass filters may be adjusted (programmed) in order to allow for optimization of a desired response characteristic. Suitably, the frequency responses of the filters are first order frequency responses but higher orders may also be employed.

Figure 6:
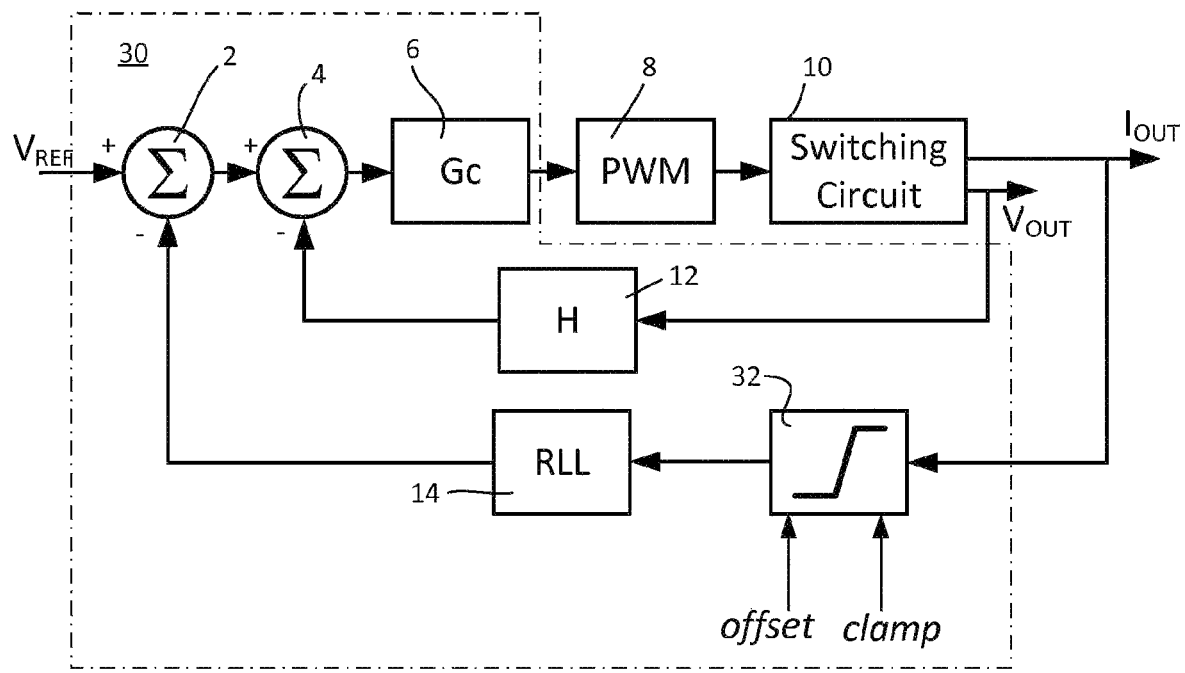
FIG. 6 is an improved controller according to a second aspect of the present application.
Figure 8:
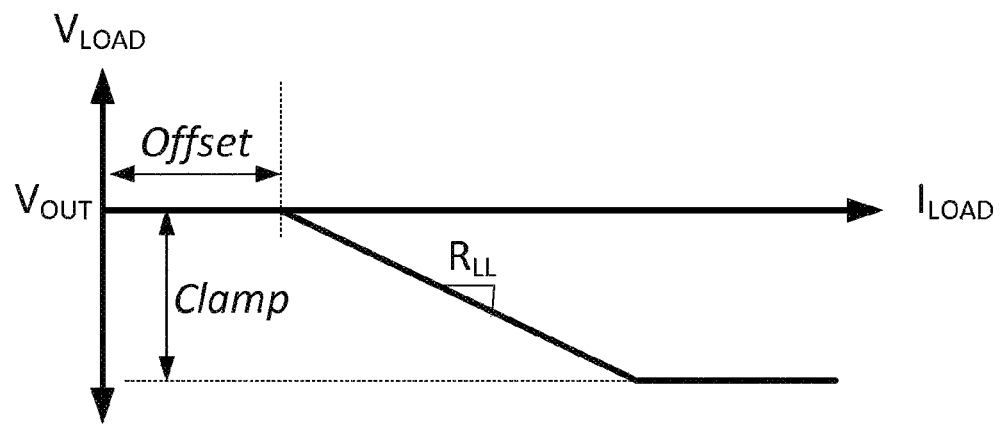
FIG. 8 illustrates the gain of the second aspect shown in FIG. 6 in which both a clamp and offset are introduced.

A further aspect is shown in FIG. 6, in which a controller is provided 30 in which the high pass filter of FIG. 5 is substituted by a saturator (clamp) and offset element which provides a lower limit below which the load line is inoperable and an upper limit where a limit (clamp) is placed on the output current which is fed back by to the load line compensator. The advantage of including the saturator in the arrangement is that the total maximum offset created by the load line may be bounded, making it easier and more reliable to design to. Separately, the inclusion of an offset allows the power supply designer to guarantee 0 V load line offset when IOUT<offset. Traditionally, there is a variation in the load line offset when IOUT is near 0 A, due to offset and gain error in the IOUT sensing circuitry. It will be appreciated that the clamp may be used with or without the offset and similarly the offset may be used with or without the clamp. Suitably, the values of the clamp and offset are adjustable/programmable. The gain curve for the offset and clamp aspect is illustrated in FIG. 8. In addition to the offset and limit values being programmable/adjustable, the effective resistance value of the load line may also be adjustable/programmable.

Figure 9:
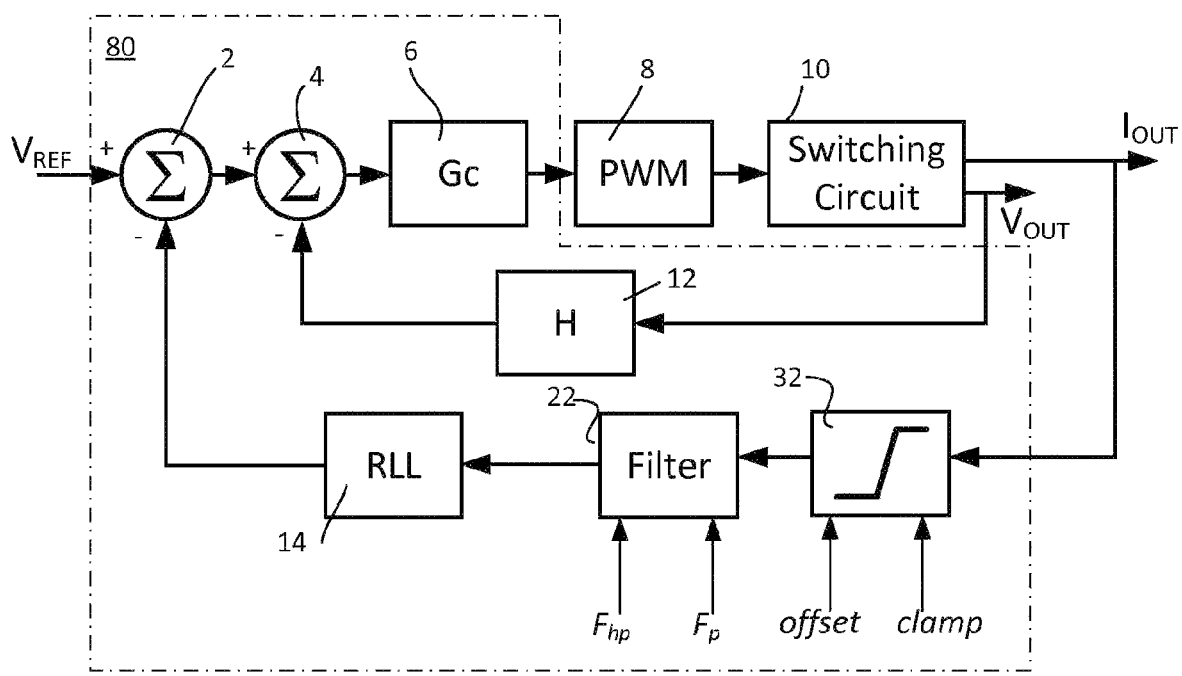
FIG. 9 illustrates an arrangement in which the first and second aspects are combined.

Although, each of the first and second aspects provide advantages in their own right, at the same time, it will be appreciated that a combination of the two aspects described above may be employed so that both high pass filtering and a offset/clamp function are applied to the current being fed back through the load line compensator as shown in the controller 80 of FIG. 9. This combination provides greater flexibility for the designer of the power supply in which the controller is being used.

Figure 10:
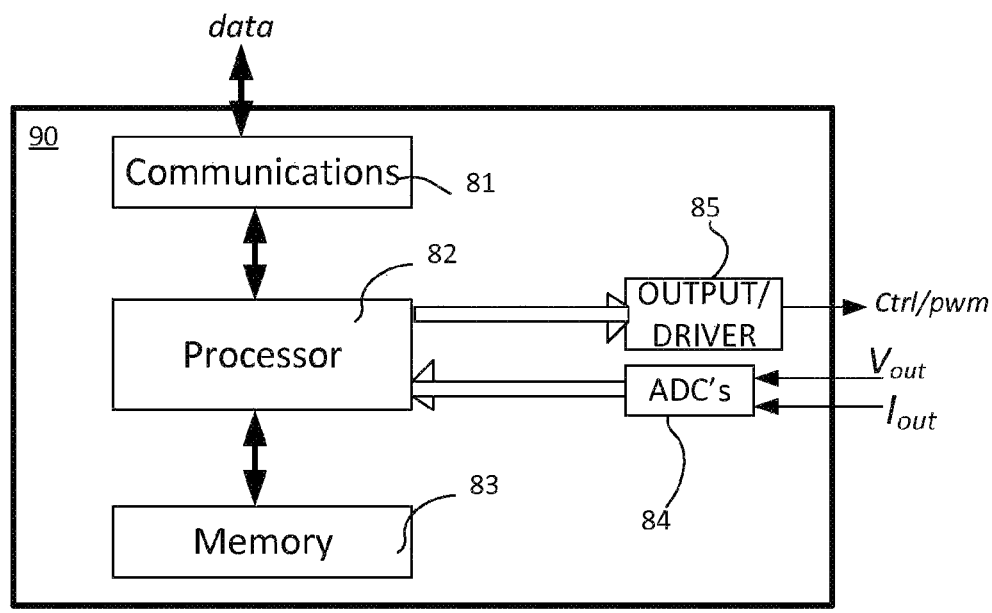
FIG. 10 is an exemplary controller suitable for implementing any one of the first aspect, second aspects or the arrangement of FIG. 9.

The controllers 20, 30, 80 described above may be implemented using a combination of components or provided together within a single integrated circuit for which an exemplary configuration for a controller 10 is provided in FIG. 10. In this exemplary arrangement, one or more analog to digital converters 84 are provided to provide digital measurements of the output voltage and current from the power supply being controlled. Other measurements may also be acquired, for example input voltage or input current to the power supply, which may be used for further control or for detecting a fault or overload condition.

The digital measurements of output voltage and current are provided to a processor which implements the control function of one of the previously described controllers 20, 30, 80. The processor in turn provides a control signal to an output circuit or driver 85 which in turn provides a control signal output to a PWM or other modulator circuit. In some arrangements, the PWM or other modulator circuit may also be provided within the integrated circuit 90. T The processor is responsive to values stored in a memory 83 on the integrated circuit. The values may include for example those determining the control function Gc and the feedback gain function H. The values may also include the reference voltage Vref. In the context, of the present application they values stored suitably include those determining whether a high pass or low pass filter is present and what the cut-off frequency is for the filter. These values may be provided as filter coefficients or as frequency values from which the processor may determine filter coefficients to employ. Similarly, the values stored may suitably include those determining whether an offset is employed for the load line function and whether a clamp is applied and if present what the values for offset and clamp are. Similarly, the value for the equivalent resistance of the resistance load line function may be provided.

The values stored in the memory may have been stored in the integrated circuit during manufacture. However, to provide flexibility, a communications circuit may be provided allowing the processor to communicate with external devices allowing for the values to be received and stored/programmed in memory.

Further flexibility may be provided allowing a power supply designer greater freedom and design choice. As an example, the processor may be configured to employ different values based on detected operating conditions. For example, the processor may employ one set of values upon start-up when the output voltage is ramping up from 0 Volts to Vref, switching to a second set of values once the output voltage has been reached. Similarly, the various functions (filters, offset and clamp) may be enabled or disabled for example when abnormal operation is detected.

It will be appreciated that the various components of the controllers may be constructed in analog or digital form or a combination of the two. Although the present application has been described in relation to particular embodiments thereof, many other variations and modifications and other uses will become apparent to those skilled in the art. It is preferred, therefore, that the present application be limited not by the specific disclosure herein, but only by the appended claims.

The invention claimed is:

1. A controller for a switching power supply providing an output voltage and an output current, the controller comprising:
   a compensator configured to provide at least one control signal to operate the switching power supply to adjust the output voltage to a first reference voltage,
   a load line compensator responsive to the output current which is configured to adjust an output of the load line compensator to the first reference voltage, wherein the load line compensator comprises an offset element that is configured to adjust a value of an output of the offset element to be zero in response to an input current to the load line compensator being below an offset value, wherein the load line compensator comprises a saturating element which is configured to limit the value of an output of the saturating element at a saturation limit in response to an input to the saturating element exceeding a threshold value.

2. The controller according to claim 1, wherein the saturation limit is an adjustable limit.

3. The controller according to claim 1, wherein the offset value is programmable.

4. The controller according to claim 1, the load line compensator further comprising a high pass filter which filters the output current employed by the load line compensator.

5. The controller according to claim 4, wherein a cutoff frequency of the high pass filter is adjustable.

6. The controller according to claim 5, wherein the load line compensator comprises a gain element such that the combination of the high pass filter and gain element provide a gain filtered value which is employed in modifying the first reference voltage.

7. The controller according to claim 6, wherein the load line compensator is configured to subtract the gain filtered value from the first reference voltage to provide a second reference voltage.

8. The controller according to claim 1, further comprising a modulator which modulates the at least one control signal to produce at least one modulated control signal and wherein the at least one modulated control signal is applied to one or more switches within a switching circuit of the switching power supply.

9. The controller according to claim 8, wherein the modulator is a pulse width modulator.

10. The controller according to claim 9, wherein the compensator is a combination of one or more of Proportional, Integral and Derivate control elements.

11. The switching power supply comprising a switching circuit and a controller according to claim 1 for controlling the switching circuit.

12. The switching power supply according to claim 11, wherein the switching power supply is a DC-DC converter.

13. The controller according to claim 1, wherein the saturation limit is a programmable limit, and the programmable limit is stored in a memory to which the controller is configured to connect.

14. The controller according to claim 1, wherein the controller is configured to provide digital measurements of the output voltage and the output current to a processor.

15. The controller according to claim 14, wherein the processor is responsive to values stored in a memory to which the processor is configured to connect.

16. The controller according to claim 15, wherein the controller is configured to communicate with an external device through a communication circuit which allows the processor to communicate with the external device allowing for values to be received and stored in the memory.

17. The controller according to claim 1, wherein a current loop for the load line compensator is outside of a voltage control loop of the compensator.

18. The controller according to claim 1, wherein the switching power supply is employed with current sharing loops.

* * * * *